United States Patent

[11] 3,581,671

| | | | |
|---|---|---|---|
| [72] | Inventor | James D. Hart | |
| | | 6526 Fordham Drive, Tucson, Ariz. 85710 | |
| [21] | Appl. No. | 793,324 | |
| [22] | Filed | Jan. 23, 1969 | |
| [45] | Patented | June 1, 1971 | |

[54] HYDRAULICALLY ACTUATED FLANGED GUIDE WHEELS OF A CONVERTIBLE RAIL-HIGHWAY VEHICLE
11 Claims, 5 Drawing Figs.

[52] U.S. Cl. .................................................. 105/215, 180/22, 280/124
[51] Int. Cl. .................................................. B61d 15/00, B61f 900, B67d 61/12
[50] Field of Search .......................................... 105/215 C; 280/124; 180/22 DZZE

[56] References Cited
UNITED STATES PATENTS

| | | | | |
|---|---|---|---|---|
| 3,003,433 | 10/1961 | Hoppe et al. | ................. | 105/215 (C) |
| 3,019,742 | 2/1962 | Kershaw | ................. | 105/215 (C) |
| 3,228,350 | 1/1966 | Cox | ................. | 105/215 (C) |
| 3,344,747 | 10/1967 | Keller | ................. | 105/215 (C) |

Primary Examiner—Arthur L. LaPoint
Assistant Examiner—Howard Beltran
Attorney—Michael Ebert ABSTRACT: A pneumatically tired convertible rail-highway vehicle provided with retractable front and rear guide wheel assemblies. The front assembly, when lowered, is adapted to engage the rails of a track and to lift the front pneumatic wheels therefrom, the rear assembly when lowered, being adapted to engage the rails of the track and to carry a portion of the rear load, the remaining portion being carried by the rear pneumatic highway wheels which remain in contact with the rails to provide the driving and braking force. The front and rear assemblies are raised and lowered by hydraulic actuators associated with a hydraulic circuit wherein oil at substantially constant pressure is supplied to the actuators by a pressurized accumulator tank. Pressure in the tank is maintained by a hydraulic pump which is controlled by a pressure sensitive switch and operates to deliver oil to the accumulator only when the pressure therein falls below a predetermined level.

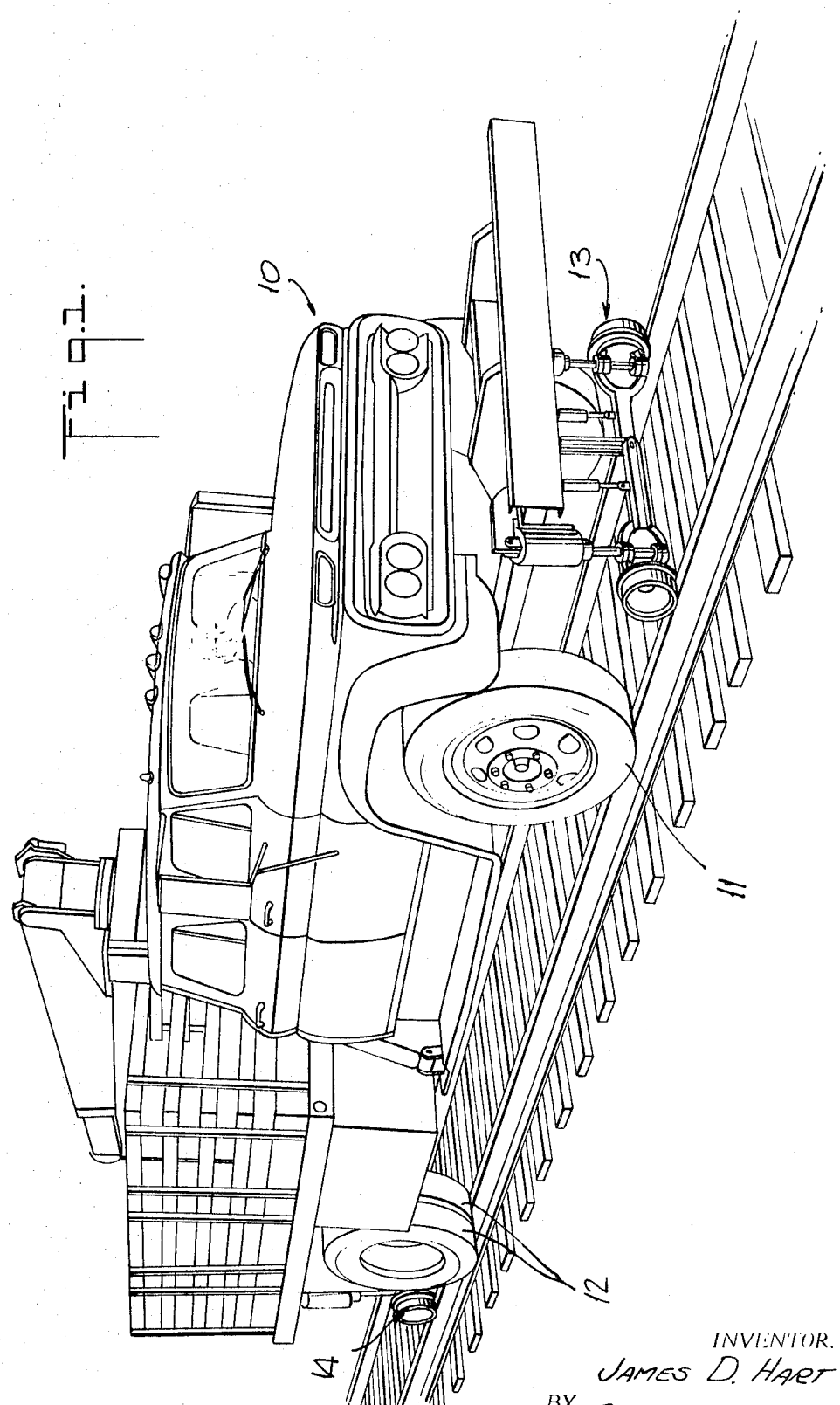

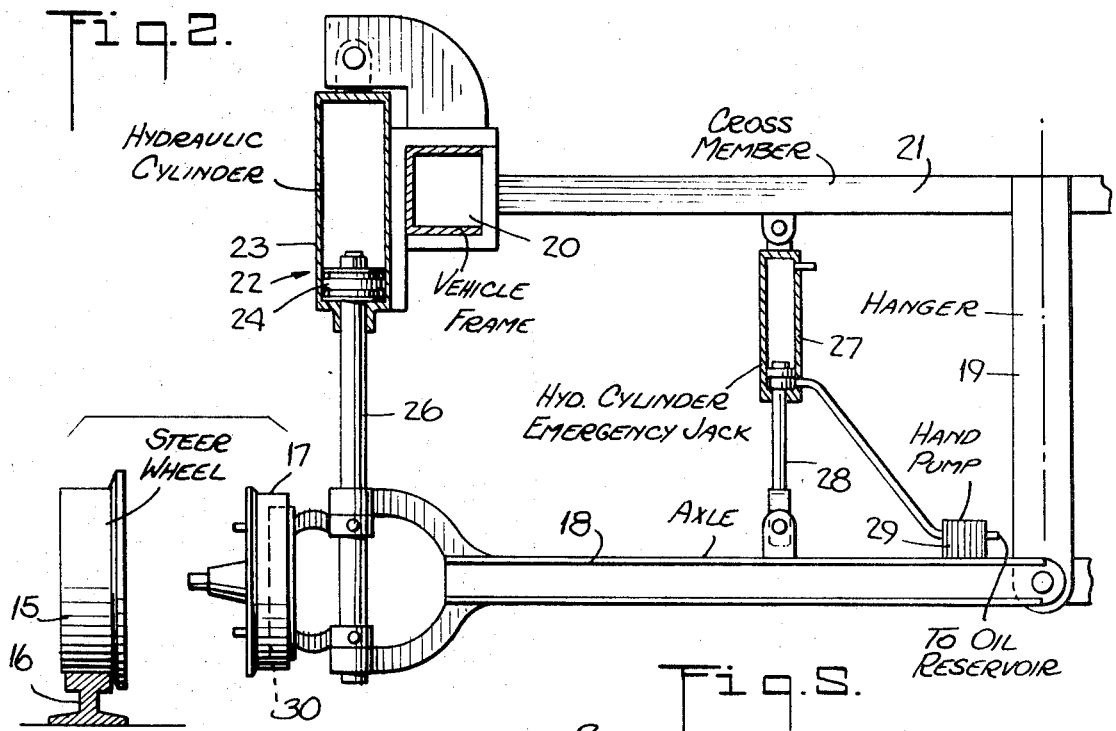
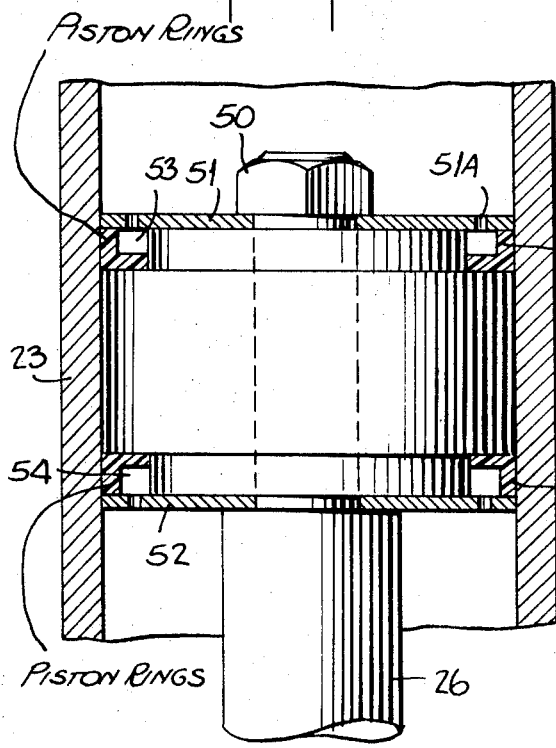
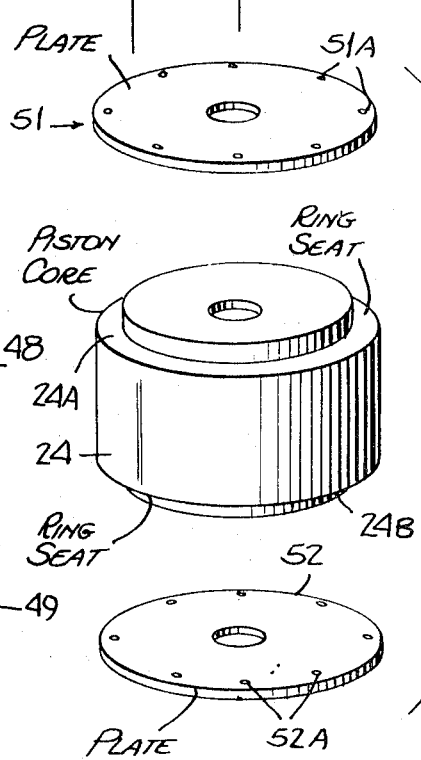

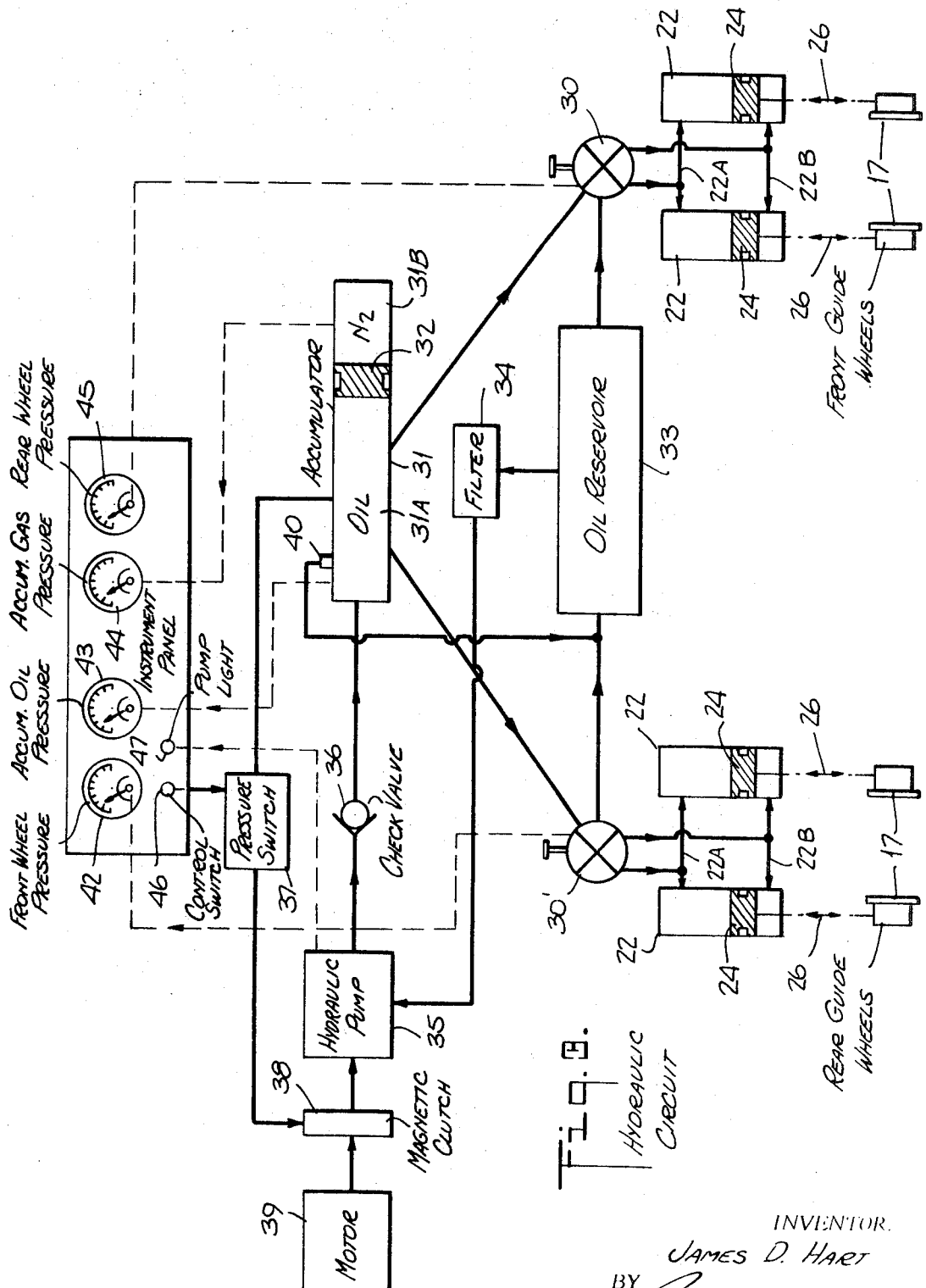

HYDRAULICALLY ACTUATED FLANGED GUIDE WHEELS OF A CONVERTIBLE RAIL-HIGHWAY VEHICLE

This invention relates generally to highway-railway vehicles, and more particularly to hydraulically operated retractable guide wheel assemblies which are attachable to standard highway vehicles to convert the vehicles to railway operation.

Vehicles fitted with guide wheel assemblies are capable of traveling on rail or on the highway, or to change from one to the other as the need arises. Existing vehicles of this type usually take the form of a heavy duty truck having a gasoline or diesel engine, the truck running on pneumatic tires and being equipped with retractable front and rear guide wheel assemblies.

The front assembly, when lowered, is adapted to engage the rails of the railroad track and to lift the pneumatic wheels of the truck above rail level, so that the front end load is entirely carried by the assembly. The rear assembly, when lowered, is also adapted to engage the rails but to carry only a portion of the rear end load of the truck, for the rear pneumatic wheels remain in contact with the rails to carry the rest of the load as well as to provide the driving and braking force. When both guide wheels assemblies are retracted, the truck operates on its pneumatic tires for highway travel. Thus conversion from highway to railway operation is effected simply by lowering or raising the guide wheel assemblies.

In guide wheel assemblies installed in existing highway-railway vehicles, the assemblies are operated hydraulically. Commercially available systems for this purpose employ hydraulic actuators which consist essentially of a cylinder having an open bore fitted with a piston. Oil is supplied by a hydraulic pump to the actuators in a selected direction through control valves whereby the actuators then function to raise or lower the associated guide wheels. The hydraulic pump is usually driven by a power take off from the vehicle transmission or by the starter motor.

In hydraulic circuits heretofore employed to operate the actuators, the capacity of the pump is such as to supply oil of the necessary volume and pressure thereto in the requisite time, which is generally thirty seconds to either lower or raise the wheels. After the assemblies are raised or lowered, the only force maintaining the set position thereof is the oil pressure in the hydraulic actuators. This pressure, after the control valves are closed, is static pressure, for no additional oil can be introduced without again opening the control valve.

When operated in the down direction, the hydraulic actuators have a tendency to leak and thereby lose pressure. In existing assemblies, the guide wheels are supported on a common axle, an actuator being provided on either side of the assembly. When the guide wheels riding on the rails pass through a curve, the center of gravity of the vehicle load imposed thereon will shift off center, thereby exerting increased pressure on the hydraulic actuator on one side of the assembly. This pressure acts to depress the leaking actuators on the loaded side of the assembly, and when the vehicle thereafter passes over a straight section of the track it will no longer run in a level position, for the depressed actuators are now out of balance with the actuators on the other side of the assembly.

The lack of balance has on many occasions resulted in derailment of the vehicle. To avoid such derailment, cautious operators of highway-railway vehicles tend to drive at inordinately slow speeds and hence are unable to meet schedules.

With previously known systems, the operator has no instrument panel to indicate the conditions of the hydraulic system, but if he becomes aware of a leak in a hydraulic actuator resulting in a lack of balance, he will restart the hydraulic pump, get out of the cab and open the cylinder control valve to bring the actuator back to operating pressure. This of course is an inefficient procedure, for the first notice the operator may have of a lack of balance is when a derailment occurs.

In an attempt to maintain a constant oil pressure in the actuator, hydraulic circuits have been arranged to keep the oil pump running at all times at full flow pressure and power, even though the actuator has reached the end of its stroke. A pressure regulator is provided to bypass the oil into a tank when the desired actuator pressure is attained. The power consumed by the continuously operating pump is dissipated in the form of heat in the oil. This constant pressure system has many disadvantages, not only because of the power consumed by the pump but also because hot oil is damaging to the cylinder packing and rings and is a primary cause of leak-off.

Another drawback of existing systems which make use of static pressure in the actuators is the absence of cushioning. Cushioning not only gives a better on-track ride, but it also helps the rear guide wheel assembly meet varying load conditions and keeps the rear guide wheels down on the rail even when going through high grade crossings. But with a hydraulic system in which the oil pressure in the actuators is static, there is little cushioning, for oil is incompressible.

In view of the foregoing, it is the main object of this invention to provide a highway-railway vehicle having front and rear guide wheel assemblies which are operated by a hydraulic circuit which dynamically maintains a substantially constant pressure in the actuator cylinders at all times and yet makes use of a hydraulic pump which operates intermittently and only when the pressure falls below the desired level.

More specifically, it is an object of this invention to provide a dynamic hydraulic system in which oil is supplied at a substantially constant pressure to hydraulic actuators by a gas-pressurized accumulator, oil being delivered to the accumulator by a hydraulic pump under the control of a pressure-sensitive switch which is actuated only when the pressure in the accumulator falls below the desired level.

A significant feature of the invention is that the line between the accumulator and the hydraulic actuators is always open, so that when a pressure surge is encountered in the actuators when the assemblies pass over rough or curved track sections, the oil backs up into the accumulator to compress the gas therein, thereby creating a springlike effect and providing cushioning and shock absorption.

Also an object of the invention is to provide a simple, low cost and efficient hydraulic circuit which includes a hydraulic pump operated intermittently from the fan belt motor of the vehicle only when the pressure in the accumulator drops below a predetermined level, thereby minimizing the power requirements of the system and preventing excessive heating of the oil therein.

Briefly stated, these objects are accomplished in a hydraulic circuit for hydraulic actuators for raising and lowering the front and rear guide wheel assemblies of a highway-railway vehicle, which circuit includes an accumulator feeding oil to the actuators in an appropriate direction through control valves which are always open, the pressure in the accumulator being sensed by a pressure-responsive switch which is caused to close only when the pressure falls below a predetermined level, the switch being connected to a magnetic clutch operatively coupling a hydraulic pump to the fan belt motor of the vehicle, the clutch being energized when the switch is closed to cause the pump to operate and supply oil to the accumulator until the pressure therein is restored to its proper level, at which point the switch opens and the pump stops.

For a better understanding of the invention as well as other objects and features thereof, reference is made to the following detailed description to be read in conjunction with the annexed drawing wherein:

FIG. 1, in perspective, shows a highway-railway vehicles equipped with front and rear guide wheel assemblies in accordance with the invention, FIG. 2 is a schematic view of one of the guide wheels and its associated hydraulic actuator, FIG. 3 schematically shows the hydraulic circuit in accordance with the invention, FIG. 4 is a sectional view of one of the hydraulic actuators, and FIG. 5 is an exploded view of the piston for the actuator.

THE GUIDE-WHEEL ASSEMBLIES

Referring now to the drawing, and more particularly to FIG. 1, there is shown a highway-railway vehicle 10 having single pneumatic tires 11 on the front wheels and dual-pneumatic tires 12 on the rear wheels of a heavy duty truck. The vehicle is equipped with a retractable front guide wheel assembly generally designated by numeral 13, and a retractable rear guide wheel assembly, generally designated by numeral 14.

The front assembly, when lowered on the rails, functions to carry the full weight of the front end. This is necessary since the front wheels are usually spaced too wide to travel on rails and hence must be lifted above the rail level to where they carry none of he the load. When on-track, the rear guide wheel assembly carries a portion of the weight of the rear end of the truck, the remainder of the load being carried by the rear pneumatic wheels.

The inner pneumatic tires of the dual rear wheels of the truck are spaced so as to center on and engage the rails to afford the driving and braking force for the vehicle. Both assemblies, as will be later explained, possess a substantial degree of vertical cushioning to provide a better on-track ride. This cushioning also helps the rear assembly to accommodate itself to varying load conditions and to maintain the rear guide wheels down on the rail even when going through high grade crossings.

Each assembly, as best seen in FIG. 2, includes a pair of steel guide wheels 15 adapted to ride on a rail 16. Each guide wheel is supported on a wheel drum 17 mounted on one end of an axle 18 whose other end is hinged to a vertical hanger beam 19 aligned with the center of the vehicle to provide individual wheel suspension. This arrangement allows each guide wheel to float within its own range without affecting any other guide wheel. In practice, each assembly may include two pairs of guide wheels rather than one pair, for heavy duty applications. In practice, hanger beam 19 may be eliminated and in place thereof a double complementary latch may be used to intercouple the adjacent ends of axles 18 so that each axle is free to move independently of the other.

Axle 18 is secured to piston rod 26 by a yoke 26A and sheer pins, whereas the drum of guide wheel 17 is freely mounted on piston rod 26 between the arms of the yoke so that it is free to rotate about the rod and thereby follow the track curvature. Since guide wheels 15 are free to rotate, they are tied to each other by a radius rod (not shown) which incorporates a double complementary latch to coordinate the swinging movement of the guide wheels as they follow their associated rails.

The assembly is supported from the frame 20 of the vehicle by a crossmember 21, the hanger beam 19 being attached thereto. Each guide wheel is lowered or raised by means of a hydraulic actuator 22. This actuator is of the double acting type used, for example, for operating airplane landing gear. Each actuator includes a cylinder 23 with an open bore into which a piston 24 is fitted, the piston being operatively coupled to the guide wheel by a rod 26. For emergency operation in the event of failure of the main hydraulic circuit, a small hydraulic jack 27 is provided which is mounted below crossmember 21, the piston rod 28 thereof being coupled to wheel axle 18. The hydraulic jack is manually operated by means of a hand pump 29 which is supplied by the oil reservoir.

Thus when the piston rod of hydraulic actuator 22 or hydraulic jack 27 is extended, axle 18 is caused to swing downwardly about its pivot point on hanger 19 to lower guide wheel 15 to the rail. When either piston rod is retracted, the wheel is raised above the rail.

Since the tire surface of the inner wheels of the dual pneumatic rear tires of the truck, which rests upon the rails, is limited to the width of the rails, and only two tires come in contact with the rails, the braking capacity of the tires is very limited and it is difficult to make emergency stops. However, by providing guide wheel with a break drum 30 equipped with an electric, hydraulic or air-operated brake cylinder controlled from the cab of the vehicle, a more effective brake action is obtained. As the structure of the braking system is otherwise conventional, the details thereof are not spelled out herein. While the guide braking system is independent of the pneumatic wheel system, the two systems are coupled to the braking pedal of the vehicle so as to function concurrently and thereby afford a highly effective braking action.

It is not essential that the rear pneumatic wheels be dual tires, for if properly spaced to engage the rails, single tires may be used. Unlike conventional guide wheels, guide wheels 15 are provided with a spiderlike hub so that it can be detachably connected to the bolts projecting from wheel drum 17, very much in the manner in which pneumatic tires on automobiles are mounted on their associated wheel drums.

THE HYDRAULIC CIRCUIT

Referring now to FIG. 3, there is shown the hydraulic circuit associated with the four hydraulic actuators 22, a pair of which serve to raise and lower the front guide wheels 15 and another pair of to raise and lower the rear guide wheels 15. Each pair of actuators is controlled by a separate hand-operated valve, a valve 30 acting in conjunction with the front guide wheel actuators and a valve 30' with the rear guide wheel actuators.

The actuators function to lower the associated guide wheels when oil under pressure is supplied by valves 30 and 30' into the upper inlet 22A of the cylinders. The actuator's function is to raise the wheels when oil is supplied by the valves into the lower inlets 22B. Oil is delivered at all times under positive pressure to the actuators by an accumulator 31.

Accumulator 31 is the stabilized pressure center of the hydraulic circuit and is constituted by a tank of circular cross section having a diameter and length providing the desired oil capacity. Slidably disposed within the tank is a piston 32 which divides the tank into an oil compartment 31A and a pressurized gas compartment 31B. The gas compartment is filled with nitrogen or any other inert gas to subject the oil in the oil compartment to a predetermined head of pressure.

Oil compartment 31B is coupled by suitable lines to control valves 30 and 30' which, when the vehicle is in rail operation, are always open and serve to feed the oil under substantially constant pressure to actuators 22 in a piston direction determined by the valve setting. The valve arrangement is such that when they are set to raise or lower the wheels, oil is fed into the appropriate inlet of the actuators to push the pistons in the selected direction, the oil forced out of the cylinders by the moving pistons being discharged through the other inlets and being led through bypass passages in the valves into an oil reservoir 33.

Oil reservoir 33 is a standard nonpressurized vessel, vented with a conventional dipstick tube so that the oil level may be checked. Oil from reservoir 33 is supplied through a standard oil filter 34 into a hydraulic pump 35 which, when operating, delivers the oil to accumulator 31.

A check valve 36 is interposed in the line between the pump and accumulator to prevent oil in the accumulator from backing up into the pump when the latter is not running. The check valve is a unidirectional device and is adapted to open in the direction of flow when pump pressure exceeds the pressure in the accumulator tank.

Thus the hydraulic circuit is provided with oil through a supply loop wherein oil from the accumulator is supplied under pressure to the actuators which discharge oil into the reservoir which, in turn, delivers the oil to the pump feeding the accumulator, thereby closing the loop. Of course, should leakage occur, makeup oil must be added to the reservoir.

Oil pressure in accumulator 31 is sensed by a pressure-sensitive switch 37 whose operating point is adjustable. Switch 37 is set to cause closure thereof when the accumulator oil pressure falls below a predetermined level, which level is the desired oil pressure for the actuators. Pressure-sensitive switch 37 is connected to a magnetic clutch 38 which operatively couples a power source 39 to the hydraulic pump 35.

In practice, the power source is preferably constituted by the motor fan pulley of the vehicle engine, such that when the engine is running and the magnetic clutch is energized, the hydraulic pump is driven by the fan motor. For this purpose the magnetic clutch is linked by a belt to the pulley of the motor fan. This arrangement makes installation of the system simple and inexpensive. Alternatively, the hydraulic pump may be driven through the clutch by a separate electric motor or from the transmission of the vehicle engine.

After the system is installed on a truck, hydraulic oil is sufficient quantity to operate the hydraulic circuit is added to the accumulator and an equal quantity is added to the reservoir. Nitrogen or whatever other gas is used is then introduced in the gas compartment of the accumulator until the desired operating pressure is obtained. During the addition of oil and gas to the hydraulic circuit, the valves 30 and 30' are maintained in closed condition.

To put the system in operation, the vehicle motor is started and the control valves 30 and 30' are opened, the valves thereafter remaining open at all times whether the wheels on the guide wheel assemblies are up or down. In operation, the magnetic clutch for the pump will not be energized until pressure switch 37 is closed, and this will not happen unless pressure in accumulator 31 falls below a predetermined level. When control valves 30 and 30' are first opened to feed oil into the actuators to either raise or lower the guide wheels, the resultant drop in oil pressure will cause switch 37 to close, thereby energizing the clutch and causing the pump 35 to build up oil pressure in the accumulator until a level is reached causing the pressure switch to reopen, thereby cutting off the operation of the pump.

Thus the hydraulic circuit operates dynamically to maintain a substantially constant pressure in the hydraulic actuators, for, inoperation, the valves are always open and any drop in pressure in the accumulator, as a result of leakage in the actuators, is immediately sensed and the pump is automatically put into action for a period sufficient to buildup the oil pressure to its proper value. In the event the system leaks down when the vehicle is parked for a prolonged period, pressure will immediately build up as soon as the engine is started, for the loss of pressure will be sensed by the pressure-sensitive switch to energize the clutch and operate the pump.

Accumulator 31 is provided with a relief valve 40 which, in the event the magnetic clutch fails to disengage and the pump continues to operate to create an excessive pressure in the accumulator, the pressure will be relieved and the surplus oil returned to reservoir 23. If for some reason the pump continues to run, the system will still operate in a safe manner, for the relief valve 40 on the accumulator and the bypass passages in the control valves 30 and 30' will then circulate the oil through the reservoir 23.

The charge of nitrogen gas in the accumulator affords an oil pressure cushion. With existing static hydraulic systems, even those having mechanical springs, when the assemblies are under pressure in the down position, the "give" from rough track action is almost nonexistent, for oil is noncompressible and inasmuch as the control valves are closed, there is no spring action within the actuators. But with the present invention, the control valves are always open and pressure surges within the actuators as a result, for example, of shocks produced by a rough track, create a back flow of oil into the accumulator tank, where it reacts against the divider piston 32 to compress the gas in the gas compartment. As soon as the wheels pass beyond the rough spot in the track, the compressed gas in the compartment will force the oil from the accumulator back into the actuator to restore the system to balance.

In existing systems, the operator has no instrument panel mounted with the vehicle cab, hence the first indication he receives of a leak in the hydraulic circuit is when the vehicle runs unbalanced or is derailed. With the present invention, an instrument panel is provided in the cab of the vehicle, the panel having four pressure gauges 42, 43, 44 and 45. Gauges 42 and 45 read the pressure in the rear and front assembly actuators, respectively, while gauge 43 gives the oil pressure in the accumulator compartment 31A and gauge 44 gives the gas pressure in gas compartment 31B.

Also on the panel is a control switch 46 to render pressure switch 37 operative. If this switch is out of operation, the magnetic clutch 38 and the pump 35 controlled thereby will remain inactive. Operation of the pump 35 is indicated by a panel light 47. Because of present day railroad safety regulations, the control valves 30 and 30' must be mounted outside of the vehicle cab. However, it is possible to operate these remotely from the cab by suitable electromagnetic operators controlled by switches located on the instrument panel.

An alarm may also be installed on the instrument panel. The alarm being arranged to be set off when pressure in the drops below the predetermined level. The alarm continues to sound to warn the operator until proper pressure is restored. As a further safety measure, the oil lines feeding "down" pressure to the actuators may include a cutoff valve adapted to close these lines and prevent the loss of oil from the actuators when pressure in the system falls to an inordinately low level, indicating a system failure. This safety valve will maintain static pressure in the actuators and hold the guide wheels in their down position despite the loss of system pressure. In this emergency situation, the only to way to thereafter retract the guide wheels is to open the safety valve and then jack up the guide wheels with the manual pump provided for this purpose.

THE HYDRAULIC ACTUATORS

In a conventional hydraulic actuator, the piston is provided with "O" rings which engage the wall of the cylinder to prevent leakage. All of the oil pressure is exerted in the axial direction of piston movement on the rings. As a consequence, leakage is encountered when the rings wear, for the oil is then forced under high pressure in a direction normal to the plane of the rings through the interface of the rings and cylinder walls.

In the present invention, as shown in FIGS. 4 and 5, the piston 24 has a drum-shaped core having circular grooves 24A and 24B formed at either end to form seats for piston rings 48 and 49. These may be machined of Teflon or nylon or molded of rubber. The rings engage the interior wall of the piston cylinder 23 to provide an oil seal. Piston 24 is coupled to the threaded end of the push-pull rod 26 whose other end is connected to the associated guide wheel, the rod being secured to the piston by a nut 50.

On either end of the piston there are placed disc-shaped plates 51 and 52, the plates having a circular array of holes 51A and 52A bored therein. The rings 48 and 49 are each formed with an inner groove which communicates with the holes 51A and 52A, respectively, to admit oil into the circular channels 53 and 54 defined thereby.

Thus the oil introduced into the circular channels exerts a pressure against the piston rings 53 and 54 at right angles to the oil directed vertically thereagainst. This tends to balance the pressures imposed on the piston rings and to minimize their tendency to leak. The same piston design is used in piston 32 incorporated in the accumulator 31.

I claim:

1. An engine-driven highway-railway vehicle having front and rear pneumatic wheels and retractable guide wheels assemblies, the front assembly being adapted, when lowered, to engage the rails of a track and to lift the pneumatic wheels therefrom, the rear assembly being adapted to engage the rails of the track and to share the load with the rear pneumatic wheels which remain in contact with the rails to provide a driving and braking force, said assemblies including oil-operated hydraulic actuators to raise and lower said guide wheels and a hydraulic circuit for operating said actuators, said actuators discharging oil when energized by incoming oil to raise or lower the guide wheels, said circuit comprising:

A. a pressurized oil accumulator,
   B. a nonpressurized oil reservoir,

C. conduit means having control valves interposed therein for conducting oil from said accumulator to said actuators in a selected direction to cause said actuators to raise or lower the guide wheels associated therewith, said conduit means also conducting oil discharged by said accumulators to said reservoir said control valves being always open, whereby pressure surges within the actuators create a back flow of oil into the accumulator, D. conduit means having a pump interposed therein for coupling said reservoir to said accumulator to feed oil taken from said reservoir into said accumulator, E. normally open switch means operatively coupled to said accumulator to sense oil pressure within said accumulator to cause closure of said switch when this pressure falls below a predetermined level, and F. motor means responsive to said switch closure and operatively coupled to said pump to drive said pump until the pressure in said accumulator attains said predetermined level, at which point said switch is reopened to stop said pump, thereby maintaining a substantially constant pressure in said hydraulic actuators.

2. A vehicle as set forth in claim 1, wherein said accumulator is constituted by a tank divided by a piston into an oil compartment and a gas compartment which is filled with gas subjecting said oil to the desired pressure, said switch means being coupled to said oil compartment.

3. A vehicle as set forth in claim 2, wherein said gas is nitrogen.

4. A vehicle as set forth in claim 2, wherein said oil compartment is provided with a pressure relief valve to return oil through a conduit into said reservoir when the oil pressure in said compartment is excessive.

5. A vehicle as set forth in claim 4, wherein said pump is driven through a magnetic clutch by said motor means, said magnetic clutch being energized by said switch.

6. A vehicle as set forth in claim 5, wherein said clutch is coupled by a belt to the pulley of the motor fan belt of the vehicle, which constitutes said motor means.

7. A vehicle as set forth in claim 1, wherein each of said guide wheels is mounted on a separate axle hinged to a hangar bar aligned with the center of the vehicle.

8. A vehicle set forth in claim 1, wherein each guide wheel includes an electrically-operated brake.

9. A vehicle as set forth in claim 1, wherein said actuators are double-acting devices having a piston fitted into a cylinder provided with upper and lower inlets to feed oil therein in a selected direction.

10. A vehicle as set forth in claim 9, wherein said piston is formed by a core having sealing rings seated at either end, and discs disposed on either end of said core, said discs having holes therein to introduce oil in the horizontal direction against the inner periphery of said rings.

11. A vehicle as set forth in claim 1, further including an instrument panel in the cab of said vehicle having gauges to indicate the gas and oil pressure in said hydraulic circuit.